Dec. 20, 1927.  
H. MOLL  
1,653,405  
ARRANGEMENT OF THE GAS AND AIR PASSAGES IN REVERBERATORY FURNACES  
Filed May 6, 1922
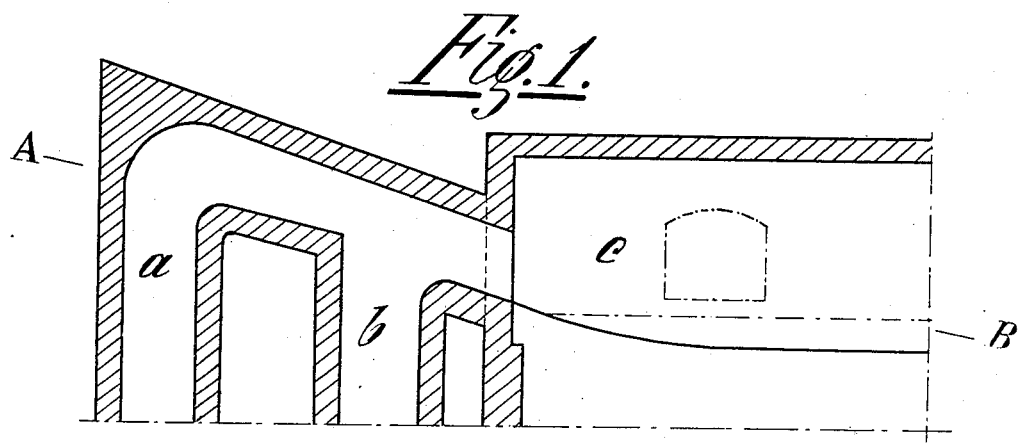
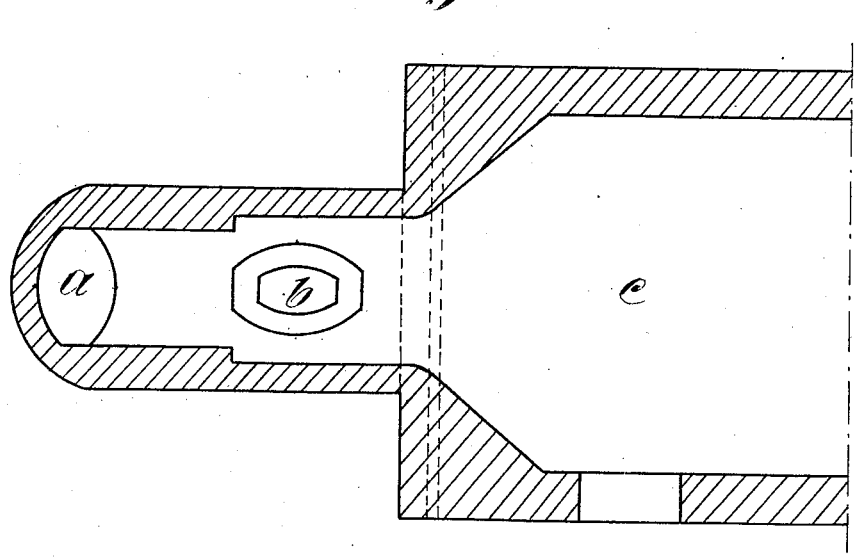
Inventor  
H. Moll  
by  
W. E. Evans  
Attorney.

Patented Dec. 20, 1927.

1,653,405

UNITED STATES PATENT OFFICE.

HERMANN MOLL, OF RASSELSTEIN, NEAR NEUWIED, GERMANY.

ARRANGEMENT OF THE GAS AND AIR PASSAGES IN REVERBERATORY FURNACES.

Application filed May 6, 1922, Serial No. 559,071, and in Germany May 20, 1921.

This invention relates to an arrangement of the gas and air passages in reverberatory furnaces of the regenerative type.

The novelty of the invention consists in the fact that the gas passage opens into the straight, downwardly inclined air passage in front of the point at which the latter opens into the hearth-chamber and that the mixture passage is not enlarged from this point to the point where the mixture issues into the furnace. This new arrangement ensures that the current of gas is completely surrounded by air, and this ensures the most complete consumption possible of the gas. The object in view is rendered more certain of attainment by reason of the fact that the gas passage at the point where it opens into the air passage is smaller than the long, shallow and straight air passage.

The invention is illustrated diagrammatically in the drawings which represent one side of an open hearth furnace, Figure 1 being a section of a side elevation and Figure 2 a section on the line A—B of Figure 1 in plan.

$a$ is the straight, relatively long, shallow air flue into which the gas flue $b$ opens transversely at a position before the straight, shallow air flue opens into the hearth chamber $c$ the air flue being as illustrated in Figure 1 slightly inclined from the horizontal without deflection downwardly on to the furnace hearth. It is of advantage to make the straight, shallow air flue wider than the gas passage at the point where the gas flue opens into it and also to make the gas flue at that position narrower than the main part of the air flue at the rear so that the current of gas may be surrounded and confined as far as possible on all sides by the current of air. In specially wide furnaces two or several of the arrangements shown may be provided on one or each side of the furnace.

I claim:

A regenerative furnace comprising a shallow air passage inclined downwardly toward the hearth of the said furnace and consisting of a straight air-directing portion and a wider shallow mixing portion having parallel walls, and a gas passage narrower than the air-directing portion of the said passage entering the mixing portion of the said air passage vertically from the bottom adjacent to the air-directing portion of said air passage.

HERMANN MOLL.